(12) United States Patent
Murakoshi et al.

(10) Patent No.: US 11,408,462 B2
(45) Date of Patent: Aug. 9, 2022

(54) ADHESION DEVICE

(71) Applicant: TOKYO KEIKI INC., Tokyo (JP)

(72) Inventors: Takao Murakoshi, Tokyo (JP); Kenji Tsuchiya, Tokyo (JP)

(73) Assignee: TOKYO KEIKI INC., Tokyo (JP)

( * ) Notice: Subject to any disclaimer, the term of this patent is extended or adjusted under 35 U.S.C. 154(b) by 0 days.

(21) Appl. No.: 17/270,955

(22) PCT Filed: Oct. 3, 2019

(86) PCT No.: PCT/JP2019/039084
§ 371 (c)(1),
(2) Date: Feb. 24, 2021

(87) PCT Pub. No.: WO2020/071476
PCT Pub. Date: Apr. 9, 2020

(65) Prior Publication Data
US 2021/0324900 A1 Oct. 21, 2021

(30) Foreign Application Priority Data
Oct. 5, 2018 (JP) .............................. JP2018-189841

(51) Int. Cl.
*F16B 47/00* (2006.01)
*B25J 5/00* (2006.01)
*B62D 63/02* (2006.01)

(52) U.S. Cl.
CPC .............. *F16B 47/00* (2013.01); *B25J 5/007* (2013.01); *B62D 63/02* (2013.01)

(58) Field of Classification Search
CPC .......... F16B 47/00; B25J 5/007; B62D 63/02; B62D 57/024
(Continued)

(56) References Cited

U.S. PATENT DOCUMENTS 4,926,957 A * 5/1990 Urakami ............... E04G 23/002
180/164
6,276,478 B1 * 8/2001 Hopkins ................. B63B 71/00
180/164
(Continued)

FOREIGN PATENT DOCUMENTS

JP 04-166480 A 6/1992
JP 05-004594 A 1/1993
(Continued)

OTHER PUBLICATIONS

Corresponding International Patent Application No. PCT/JP2019/039084, International Search Report, dated Dec. 10, 2019. English Translation.

(Continued)

*Primary Examiner* — Muhammad Ijaz
(74) *Attorney, Agent, or Firm* — Cooper Legal Group LLC

(57) ABSTRACT

An adhesion device 10 that defines a decompression space D to be decompressed between a wall surface W and the adhesion device 10, and adheres to the wall surface W, comprises: a base 11 disposed facing a wall surface W at a distance from the wall surface W and connected to a decompression device 14 that depressurizes the decompression space D created between the base 11 and the wall surface W; a first partition 12 disposed on a fringe of the base 11, wherein the first partition 12 forms the base 11 side portion of the peripheral wall of the decompression space D with an elastic member; a second partition 13 disposed closer to the wall surface W side than the first partition 12, wherein the wall surface W side portion of the peripheral wall of the decompression space D is formed by an elastic member so that the wall surface W side end of the second partition 13 contacts the wall surface W; and a first restricting member 16 formed in a frame shape corresponding to (Continued)

that of the second partition 13 by a member having a higher rigidity than that of the second partition 13, wherein the first restricting member 16 is disposed on the second partition 13 so as to restrict the deformation of the base 11 side end of the second partition 13 from being pulled into the decompression space D as the decompression space D becomes negatively pressured.

20 Claims, 12 Drawing Sheets

(58) Field of Classification Search
USPC .................................................... 248/205.8
See application file for complete search history.

(56) References Cited

U.S. PATENT DOCUMENTS

| | | | | |
|---|---|---|---|---|
| 9,675,897 | B2* | 6/2017 | Clark, Jr. | ............... A63H 30/04 |
| 10,696,338 | B2* | 6/2020 | Matsuyama | ........... B62D 55/06 |
| 2003/0027508 | A1 | 2/2003 | Urakami | |
| 2006/0231705 | A1* | 10/2006 | Liu | ......................... F16B 47/00 |
| | | | | 248/205.5 |
| 2008/0210834 | A1* | 9/2008 | Takahashi | ............... F16B 47/00 |
| | | | | 248/205.8 |
| 2019/0337581 | A1* | 11/2019 | Matsuyama | ........... B62D 55/06 |

FOREIGN PATENT DOCUMENTS

| | | |
|---|---|---|
| JP | 05-263817 A | 10/1993 |
| JP | 06-072365 A | 3/1994 |
| JP | 10-264032 A | 10/1998 |
| JP | 2000-062659 A | 2/2000 |
| KR | 10-0888861 B1 | 3/2009 |

OTHER PUBLICATIONS

Corresponding European Patent Application No. 19865960.3, Extended European Search Report dated Nov. 22, 2021.
Corresponding European Patent Application No. 19869560.3, Extended European Search Report dated Nov. 22, 2021.

* cited by examiner

ADHESION DEVICE

TECHNICAL FIELD

The present invention relates to an adhesion device that can adhere to a wall surface.

BACKGROUND ART

Robots that can move on walls have been in use as moving devices for inspecting structures. As a robot of this type, one that can move on wall by adhering to the wall surface with an adhesion device installed in the body has been proposed, wherein the adhesion methods include propellers pushing against the wall, vacuum adhesion with a vacuum pump or fan, attraction of wall using magnetic force, electrostatic force, or intermolecular force.

To move the robot stably by adhering it to the surface of a structure such as a bridge pier, a box girder, or exterior walls of a building, i.e., made of electrically insulating materials such as concrete, vacuum adhesion using a vacuum pump or a fan is effective among the above-mentioned adhesion methods. In vacuum adhesion, the air in the space between the robot and the surface to be adhered to is exhausted to depressurize the space, and the robot is adhered to the surface by the difference of pressure between the space and the atmosphere.

As a device for traveling on a wall surface by means of such vacuum adhesion, a traveling vehicle is known that comprises one set of driving and traveling means disposed on each side of the traveling vehicle, wherein the traveling vehicle further comprises a pressure receiving body formed from rigid or semi-rigid material, a partition that defines a decompression space in concert with the pressure receiving body and the surface the traveling vehicle moves on, and a decompression means for exhausting fluid from the decompression space to depressurize the decompression space (see Patent Document 1).

CITATION LIST

Patent Document

[Patent Document 1] JP 2000-62659

DISCLOSURE OF THE INVENTION

Problems to be Solved by the Invention

In the case of vacuum adhesion, since the wall surface to be adhered to often has gaps and irregularities, the adhesion force on such wall surfaces is drastically reduced and the wall surface cannot be stably adhered. Further installing a partition which surrounds the decompression space to be decompressed and has a portion that contacts the wall surface made with a less rigid material may better cope with such gaps and irregularities on the surface, but there is a problem in that the partition can be pulled into the decompression space and hinder a stable adhesion.

The present invention has been made to solve the above problem, and the object thereof is to provide an adhesion device that can adhere to the wall surface more stably.

Means for Solving the Problems

In order to solve the above-mentioned problems, the adhesion device disclosed in some embodiments of the invention is an adhesion device that defines a decompression space to be decompressed between a wall surface and the adhesion device, and adheres to the wall surface, comprising: a base disposed facing the wall surface at a distance from the wall surface and connected to a decompression device that depressurizes the decompression space created between the base and the wall surface; a first partition disposed on a fringe of the base, wherein the first partition forms the base side portion of the peripheral wall of the decompression space with an elastic member; a second partition disposed closer to the wall surface side than the first partition, wherein the wall surface side portion of the peripheral wall of the decompression space is formed by an elastic member so that the wall surface side end of the second partition contacts the wall surface; and a first restricting member formed in a frame shape corresponding to that of the second partition by a member having a higher rigidity than that of the second partition, wherein the first restricting member is disposed on the second partition so as to restrict the deformation of the base side end of the second partition from being pulled into the decompression space as the decompression space becomes negatively pressured.

Advantageous Effects of the Invention

According to the present invention, an adhesion device can adhere to the wall surface more stably.

BEST MODE FOR CARRYING OUT THE INVENTION

Hereinafter, some embodiments of the present invention will be described with reference to the accompanying drawings.

A First Embodiment of the Disclosure

Configuration of a Moving Device

Figure 1:
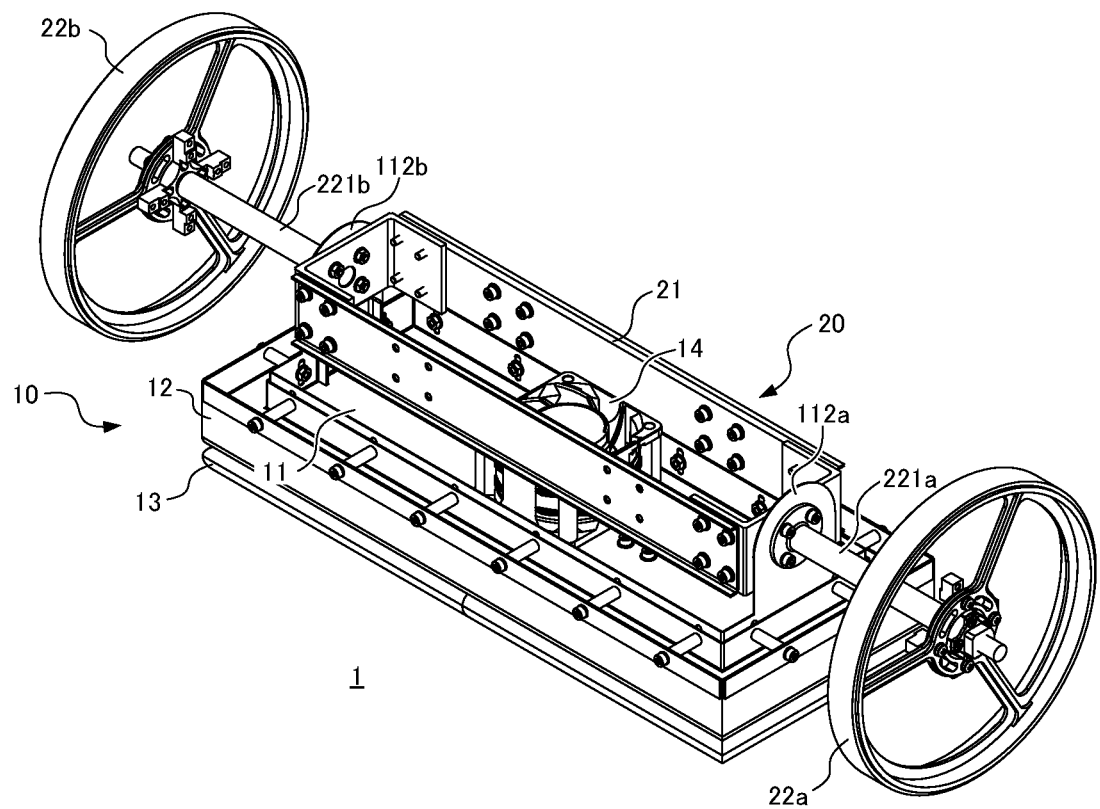
FIG. 1 is a schematic perspective view illustrating a configuration of a moving device of the first embodiment.

A configuration of a moving device in a first embodiment will be described. FIG. 1 is a schematic perspective view illustrating a configuration of the moving device in the first embodiment.

As shown in FIG. 1, the moving device 1 of this embodiment is equipped with an adhesion device 10 and a traveling device 20. The traveling device 20 is equipped with a body 21 and two wheels 22a, 22b, and each of the two wheels 22a, 22b is rotatably disposed on the body 21 via rotating shafts 221a, 221b whose axial directions are parallel and whose axes are aligned. In this traveling device 20, it is assumed that a driving device is provided to rotate the rotating shafts 221a, 221b, but in FIG. 1, the moving device 1 is shown without the driving device. With the traveling device 20 equipped, the moving device 1 can move on a wall surface by rotating the two wheels 22a, 22b around the rotating shafts 221a, 221b.

In the following explanation, the direction the moving device 1 moves straight is referred to as front-back direction, the axial direction of the rotating shafts 221a, 221b is referred to as side-to-side direction, and the direction perpendicular to the front-back direction and side-to-side direction, that is, the direction substantially perpendicular to the wall surface where the two wheels 22a, 22b moves on, is expressed using the terms "vertical direction", "vertical", or "vertically". The wall surface side in this vertical direction is expressed using the terms "lower", "downward", or "bottom", and the opposite is "upper", "upward", or "top".

The front-back direction and the side-to-side direction are collectively referred to as orthogonal directions, i.e. directions orthogonal to the vertical direction.

The adhesion device 10 is attached to the main body 21 of the traveling device 20 so that it is positioned at the lower side of the main body 21. The moving device 1 can move along the wall surface driven by the traveling device 20 while the adhesion device 10 is attracted to the wall surface.

Configuration of the Adhesion Device

Figure 2:
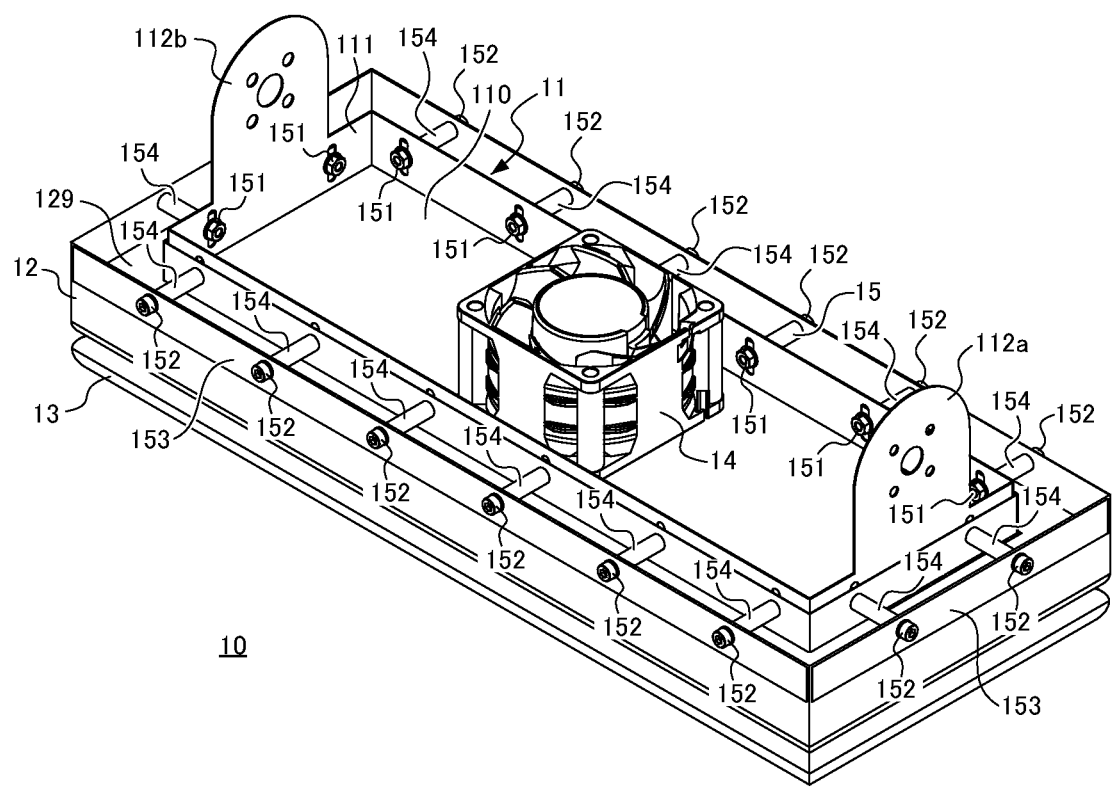
FIG. 2 is a schematic perspective view illustrating a configuration of an adhesion device of the first embodiment.

A configuration of an adhesion device in the first embodiment will be described. FIG. 2 is a schematic perspective view illustrating the configuration of the adhesion device in the first embodiment.

As shown in FIG. 2, the adhesion device 10 comprises a base 11, a first partition 12, a second partition 13, and a decompression device 14. The base 11, the first partition 12, the second partition 13 and a wall surface in concert form a decompression space of a predetermined size in the vertical direction. The adhesion device 10 is configured so that it can be attracted to the wall surface when the decompression space is depressurized by the decompression device 14 to create a negative pressure.

The base 11 is a member that closes the decompression space from upper direction by being installed vertically opposite and separated from the wall surface across the decompression space. The base 11 comprises a substantially flat bottom portion 110 extending in orthogonal directions, and a peripheral wall portion 111 formed across all of the fringe of the bottom portion 110 and extending upward from the fringe, and is formed in a box-like structure as a whole that is open at the top. An exhaust port (not shown) is provided on the bottom portion 110 to communicate the decompression space with the outside, and a decompression device 14 is provided to depressurize the decompression space through the exhaust port. Two mounting portions 112a and 112b are disposed on either side of the peripheral wall 111 facing each other in the side-to-side direction and extend in upward direction respectively, and the adhesion device 10 is attached to the traveling device 20 via the two mounting portions 112a and 112b.

The first partition 12 and the second partition 13 are members that constitute a partition between the decompression space and the outside by enclosing the decompression space from orthogonal directions, that is, from the front-back direction and the side-to-side direction, throughout the entire circumference. The first partition 12 is attached to the peripheral wall 111 to surround the peripheral wall 111. The second partition 13 is connected to the lower part of the first partition 12. The first partition 12 forms a portion of the peripheral wall of the decompression space close to the base 11, and the second partition 13 forms a portion of the peripheral wall of the decompression space close to the wall surface.

The decompression device 14 is disposed on the bottom portion 110 of the base 11 in order to depressurize the decompression space through the exhaust port as described above. In this embodiment, the decompression device 14 is configured with an exhaust fan, but it can be configured with any device as long as it is capable of depressurizing the decompression space, for example, a vacuum pump.

Configuration of the First Partition

Figure 3:
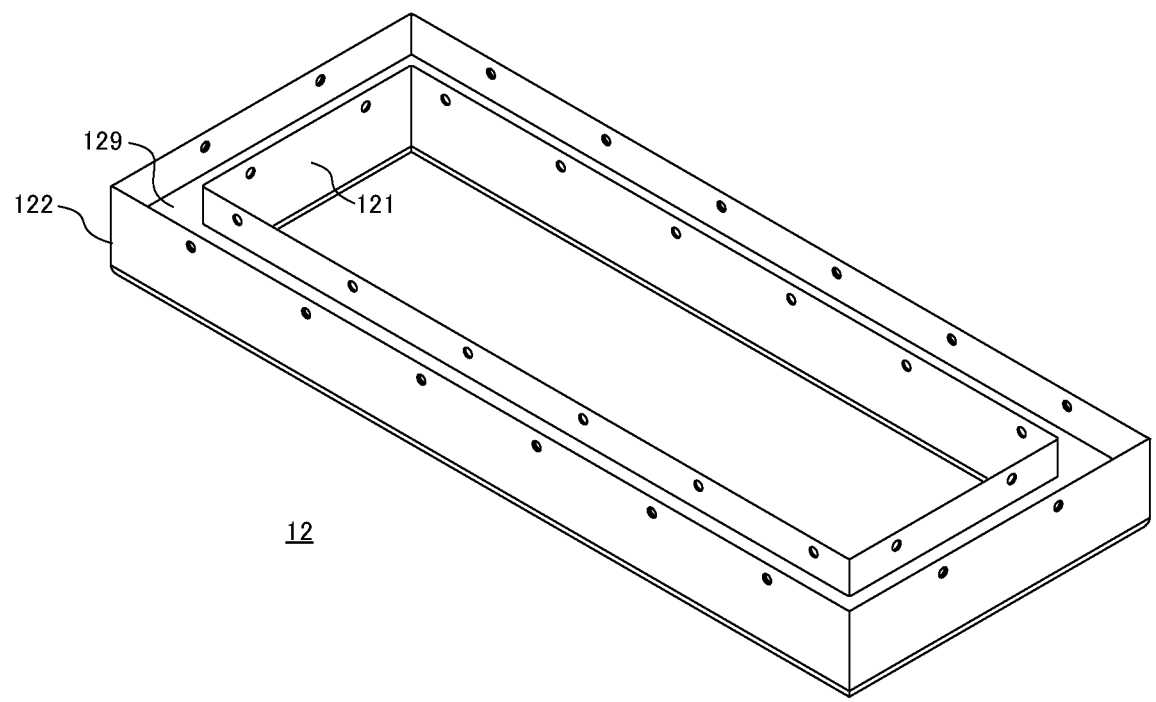
FIG. 3 is a schematic perspective view illustrating a configuration of a first partition.
Figure 4:
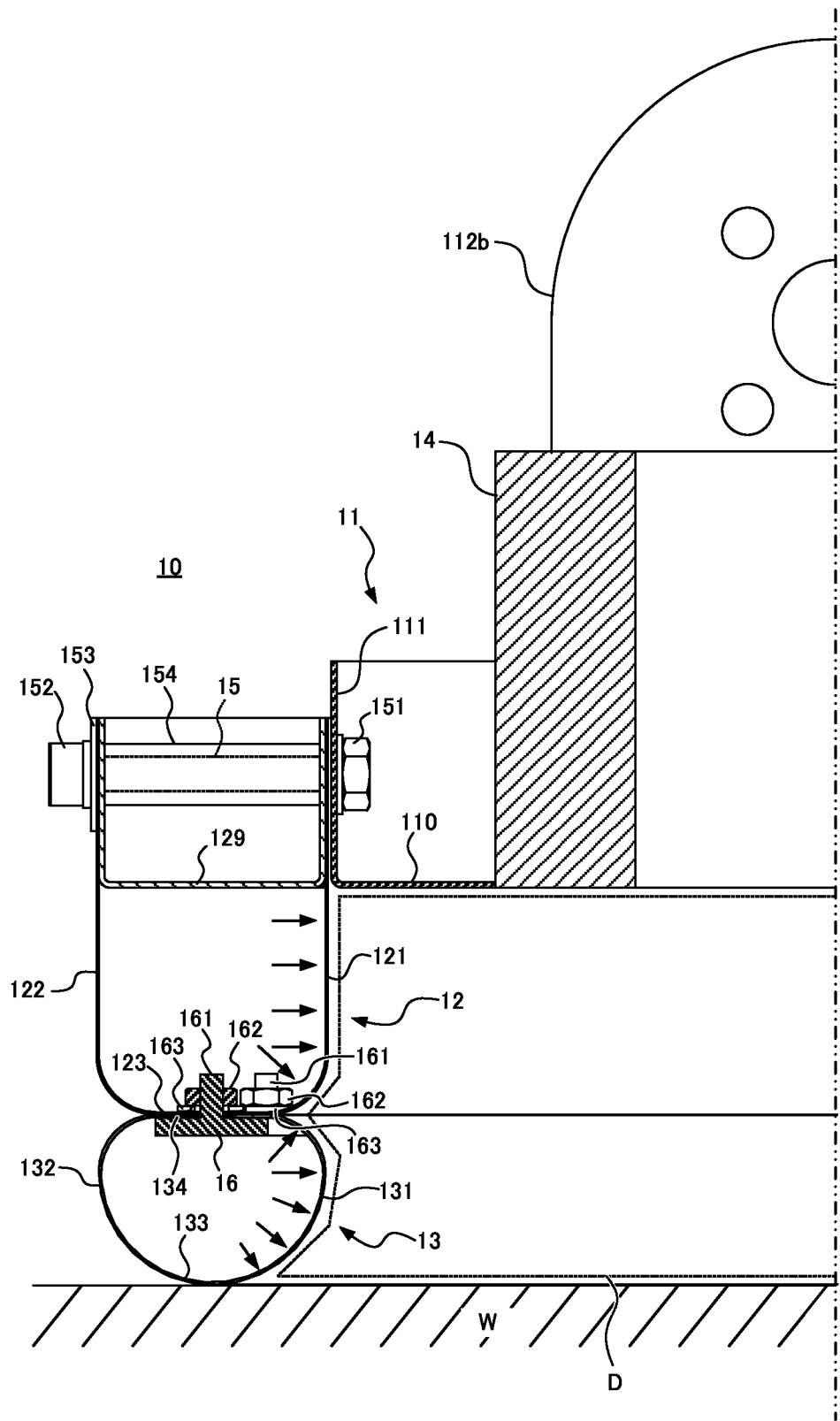
FIG. 4 is a cross-sectional view illustrating a configuration of a partition.

A configuration of the first partition will be described. FIG. 3 is a schematic perspective view illustrating the configuration of the first partition. FIG. 4 is a cross-sectional view illustrating the configuration of the partition.

As shown in FIG. 3, the first partition 12 is formed in a frame shape as a whole so that it surrounds the decompression space from orthogonal directions all around, and also, as shown in FIG. 4, has a cross section substantially U-shaped and opening upward. The cross section means a cross section of the first partition 12 cut by a plane perpendicular to the direction of its extension in a front-back or side-to-side direction. The first partition 12 has: at its inner side in the orthogonal direction, an inner wall portion 121 that extends vertically for a predetermined distance and encloses the decompression space from orthogonal directions; at its outer side in the orthogonal direction, an outer wall portion 122 that extends vertically for a predetermined distance and encloses the inner wall portion 121 from orthogonal directions; and a bottom wall portion 123 that extends in the orthogonal direction and connects the inner wall portion 121 and the outer wall portion 122 at the bottom. In this description, a frame shape means a shape that surrounds a predetermined space, such as an annular frame or a rectangular frame.

The inner wall portion 121, the outer wall portion 122 and the bottom wall portion 123 are formed by bending a sheet-like elastic member. In this embodiment, this elastic member is a urethane rubber sheet formed into a thin film of 0.2 mm thickness. The first partition 12 is connected to the base 11 with a connecting member 129. The connecting member 129 is formed in a frame shape as a whole, as shown in FIG. 3, and has a substantially U-shaped cross section opening upward, as shown in FIG. 4.

The first partition 12 is fastened by bolts 15 and tubular spacers 154 in a state where the inner wall portion 121 is sandwiched between the connecting member 129 and the peripheral wall 111 of the base 11, and the outer wall portion 122 is sandwiched between the connecting member 129 and long plate-shaped connecting plates 153 (see FIG. 2). The bolts 15 are formed in a cylindrical shape with a head 152 formed at one end and a screw thread (not shown) formed at the other end, and by tightening nuts 151 on the screw thread, the peripheral wall portion 111 and the first partition 12 are connected. In this connected state, the members related to the connection of the first partition 12 and the peripheral wall portion 111 are arranged, from outside in the orthogonal direction (from left in FIG. 4), in the order of the head 152, the connecting plate 153, the outer wall portion 122, the connecting member 129, the inner wall portion 121, the peripheral wall portion 111, and the nut 151.

As described above, since the first partition 12 is made of an elastic member reducing the rigidity in the vertical direction, and the inner wall portion 121 and outer wall portion 122 are connected to the base 11, the movement of the first partition 12 in orthogonal directions is restricted. Thus, it is possible to reduce the excessive pulling of the first partition 12 into the decompression space D, as shown in FIG. 4, and also to prevent the first partition 12, especially the inner wall portion 121 thereof, from touching a member (not shown) disposed in the decompression space D.

Configuration of the Second Partition

Figure 5:
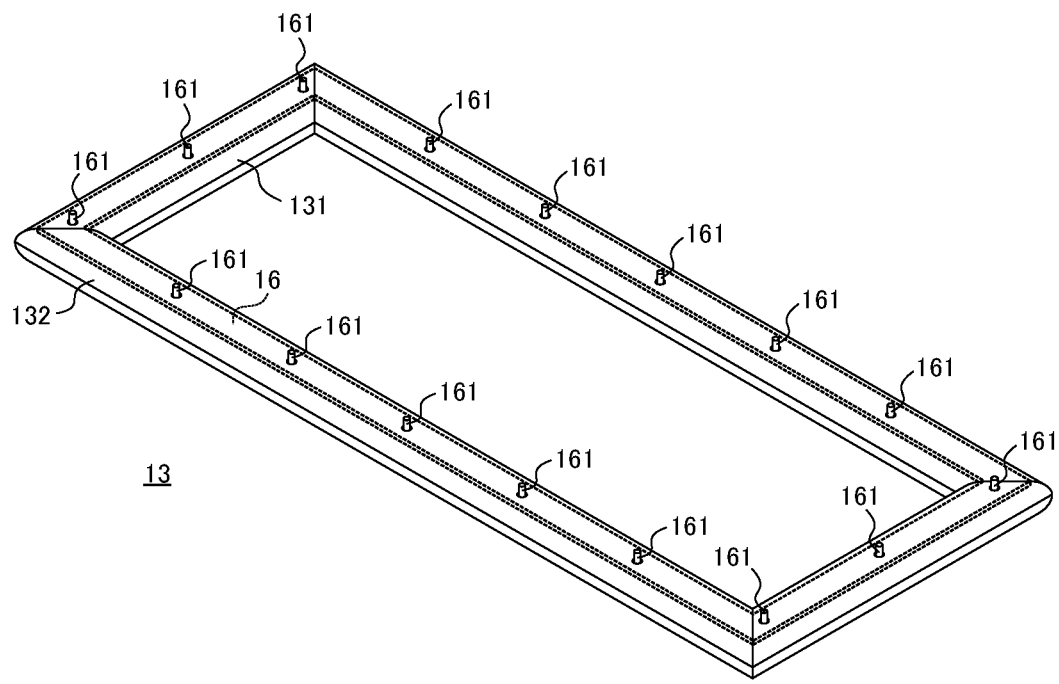
FIG. 5 is a schematic perspective view illustrating a configuration of a second partition.
Figure 6:
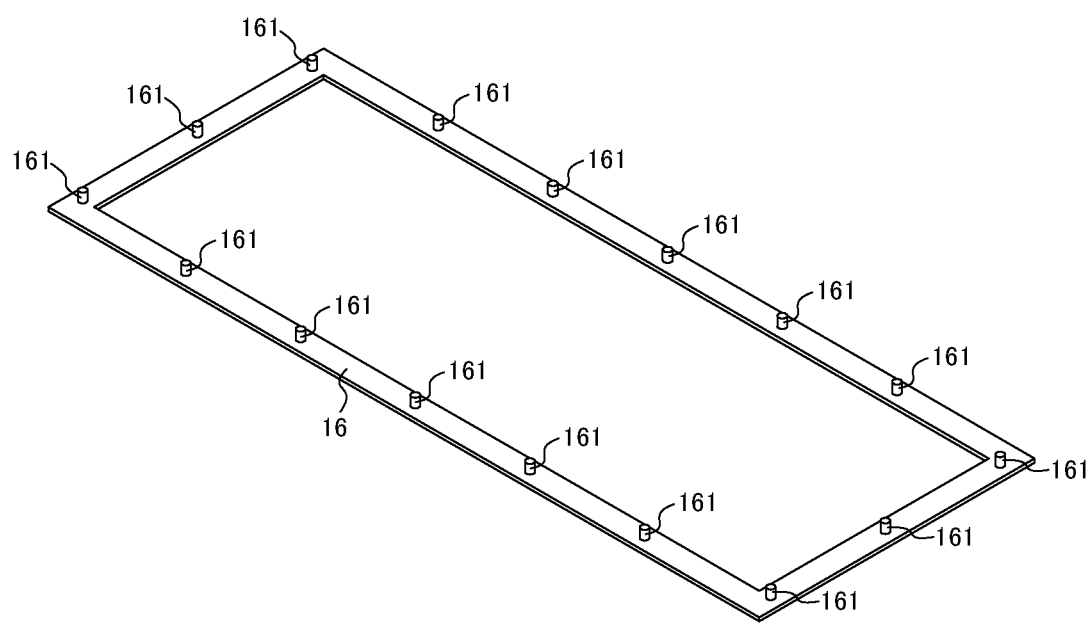
FIG. 6 is a schematic perspective view illustrating a configuration of a restricting member.
Figure 7:
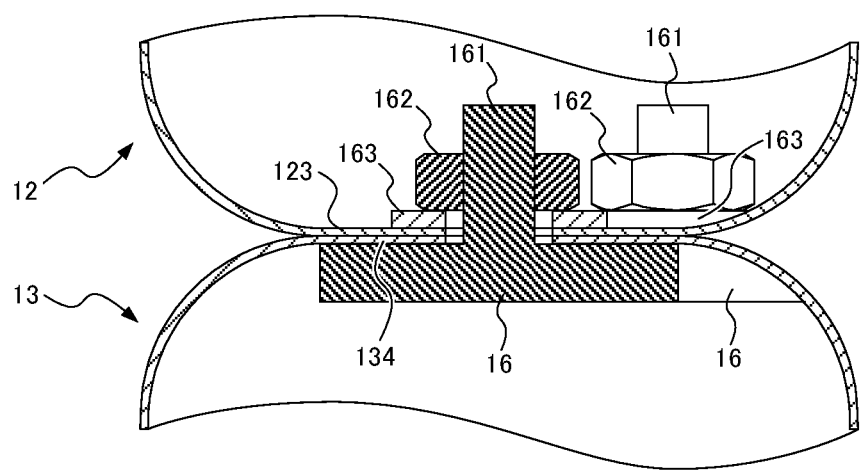
FIG. 7 is a cross-sectional view illustrating a connection between the first and second partitions.

A configuration of a second partition will be described. FIG. 5 is a schematic perspective view illustrating the configuration of the second partition. FIG. 6 is a schematic perspective view illustrating the configuration of a restricting member. FIG. 7 is a cross-sectional view illustrating a connection between the first and second partitions.

As shown in FIG. 5, the second partition 13, like the first partition 12, is formed in a frame shape as a whole so as to surround the decompression space from orthogonal directions all the way around, and its cross section is formed in a tubular shape as shown in FIG. 4. The second partition 13 has: at its inner side in the orthogonal direction, an inner wall portion 131 extending in a manner to enclose the decompression space from orthogonal directions; at its outer side in the orthogonal direction, an outer wall portion 132 extending in a manner to enclose the inner wall portion 131 from orthogonal directions; a bottom wall portion 133 connecting at the bottom of the inner wall portion 131 and the outer wall portion 132 separated in the orthogonal direction; and a top wall portion 134 connecting the inner wall portion 131 and the outer wall portion 132 at the top.

The bottom wall portion 133 of the second partition 13 is formed in a curved surface that protrudes downward, thereby narrowing the area of the second partition 13 contacting the wall surface, and thus reducing the friction generated on the second partition 13 in a movement of the moving device 1.

The inner wall portion 131, outer wall portion 132, bottom wall portion 133, and top wall portion 134 are formed by bending a sheet-like elastic member into a tubular shape, and in this embodiment, shall be formed by 0.2 mm thick urethane rubber sheets as in the first partition 12. The internal space defined by the inner wall portion 131, outer wall portion 132, bottom wall portion 133, and top wall portion 134 accommodates a restricting member 16 as shown in FIG. 6.

As shown in FIG. 6, the restricting member 16 is a member formed as a frame whole of which can be accommodated in the internal space of the second partition 13, and formed in a plate-shape having a plane parallel to the orthogonal direction, having a plurality of protrusions 161 provided at predetermined intervals on its upper surface. Each of the plurality of protrusions 161 is formed in the form of a cylinder protruding upward and provided with a screw thread on its lateral surface.

FIG. 7 shows a cross section around the restricting member 16 cut by a plane perpendicular to a direction of its extension in a front-back or side-to-side direction, passing through the point where a protrusion 161 is formed. As shown in FIG. 7, the connection between the first partition 12 and the second partition 13 is made by having a protrusion 161 of the restricting member 16 penetrate the top wall portion 134 of the second partition 13 and the bottom wall portion 123 of the first partition 12 from the internal space of the second partition 13, and having the bottom wall portion 123 of the first partition 12 and the top wall portion 134 of the second partition 13 sandwiched between a washer 163 and the restricting member 16, and a nut 162 tightened on the protrusion 161. In this connected state, the members related to the connection between the first partition 12 and the second partition 13 are arranged from above in the order of the nut 162, washer 163, bottom wall portion 123, top wall portion 134, and restricting member 16.

The connection between the first partition 12 and the second partition 13 may be made by other members, and the restricting member 16 may be any member that is connected to at least a part of the top wall portion 134 of the second partition 13 so as to restrict the movement of the second partition 13 in orthogonal directions. For this purpose, it is desirable that the restricting member 16 is made of a material that is at least more rigid than the second partition 13, and that is rigid and lightweight to reduce the weight of the moving device 1.

As described above: the rigidity of the second partition 13 in the vertical direction is reduced as it is made of an elastic member; excessive pulling of the second partition 13 into the decompression space D, as shown in FIG. 4, can be reduced since the restricting member 16 restricts the movement of the second partition 13 in orthogonal directions, and the fixing position of the second partition 13 can be made low; and consequently, a reduction of the adhesion force of the adhesion device 10 caused by the bottom wall portion 133 of the second partition 13 separating from the wall surface W can be prevented.

Behavior of the Partition

Figure 8:
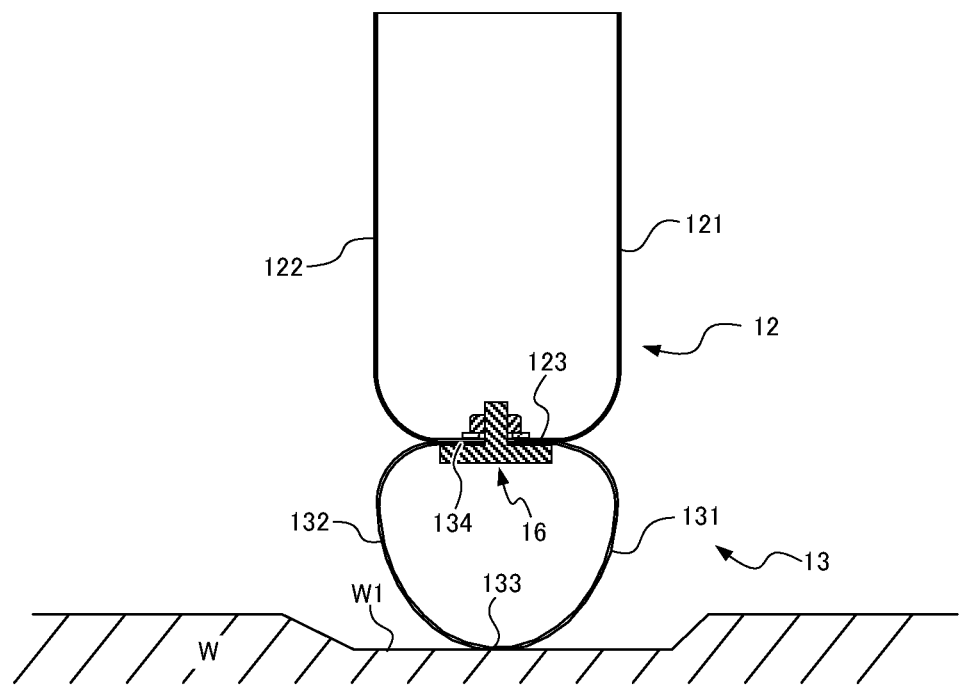
FIG. 8 is a cross-sectional view illustrating a partition passing across a dent.
Figure 9:
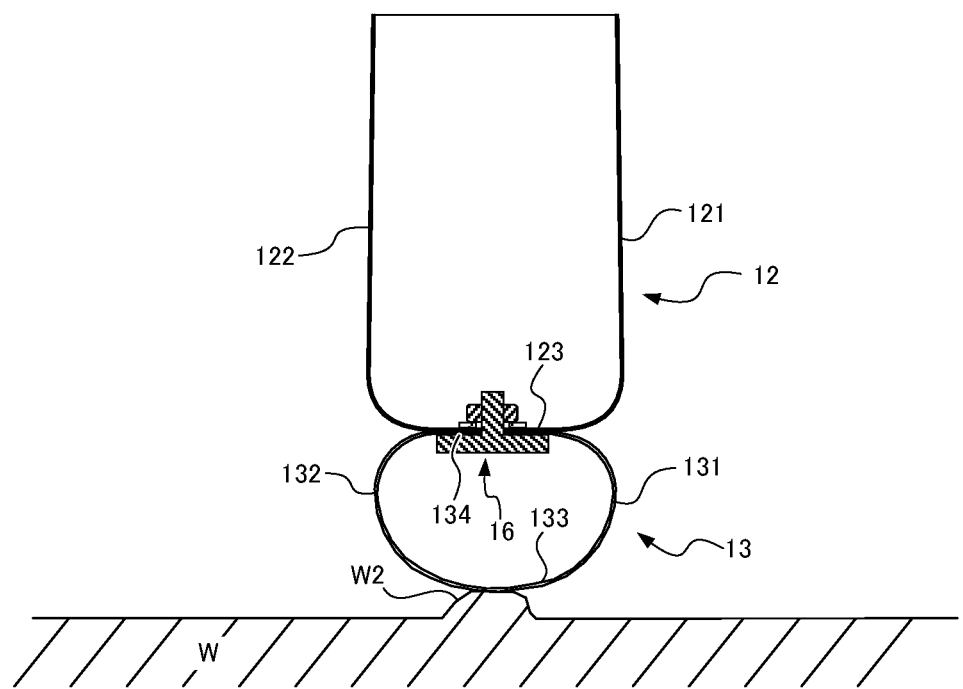
FIG. 9 is a cross-sectional view illustrating a partition passing over a bump.

A behavior of the partition when passing over irregularities on a wall surface will be described. FIG. 8 is a cross-sectional view illustrating a partition passing across a dent. FIG. 9 is a cross-sectional view illustrating a partition passing over a bump.

As shown in FIG. 8, when the partition passes across a dent W1 in the wall surface W, the vertical elastic force of the first partition 12 and second partition 13 in conjunction with negative pressure deforms the first partition 12 and second partition 13 in such a way that the first partition 12 and second partition 13 extend downward and the bottom wall portion 133 of the second partition 13 contacts the dent W1, and consequently the adhesion force of the adhesion device 10 is maintained.

As shown in FIG. 9, when the partition passes over a bump W2 on the wall surface W, the first partition 12 and second partition 13 shrink vertically following the bump W2, which allows the moving device 1 to pass over the bump W2 while maintaining the adhesion force by the adhesion device 10.

In addition, even when the partition expands or shrinks as the partition passes over a dent W1 or bump W2, the base 11 and the restricting member 16 prevent excessive pulling of the first partition 12 and second partition 13 into the decompression space.

A Second Embodiment of the Disclosure

Figure 10:
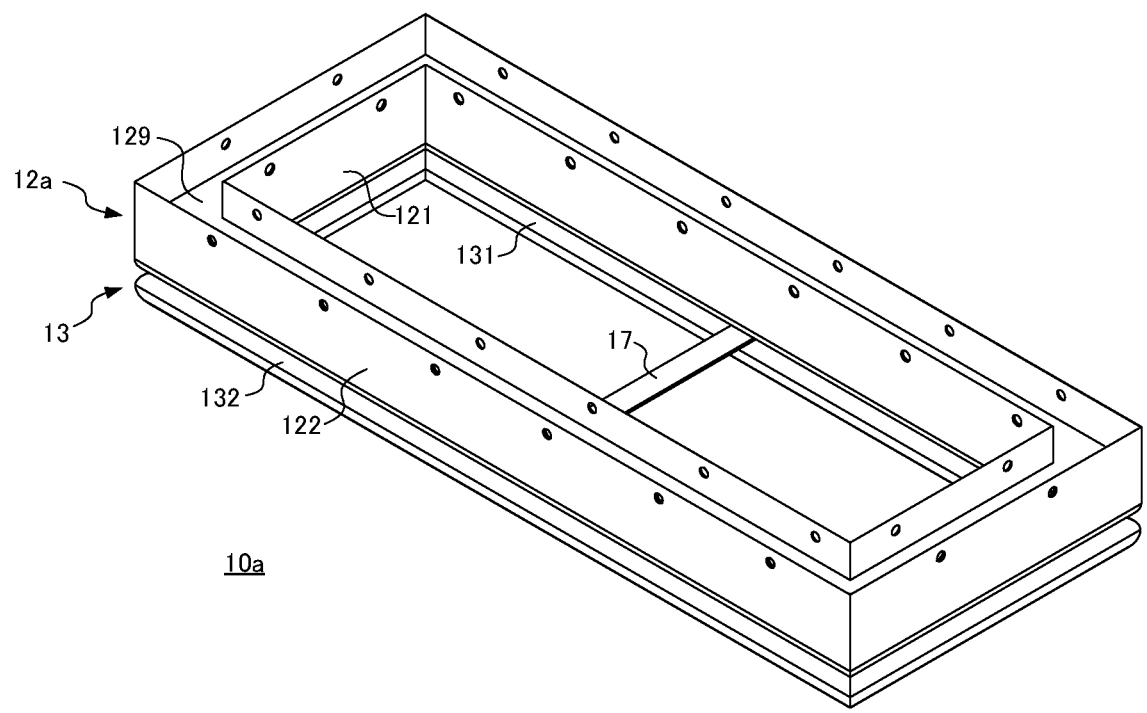
FIG. 10 is a schematic perspective view illustrating a configuration of a partition of the second embodiment.
Figure 11:
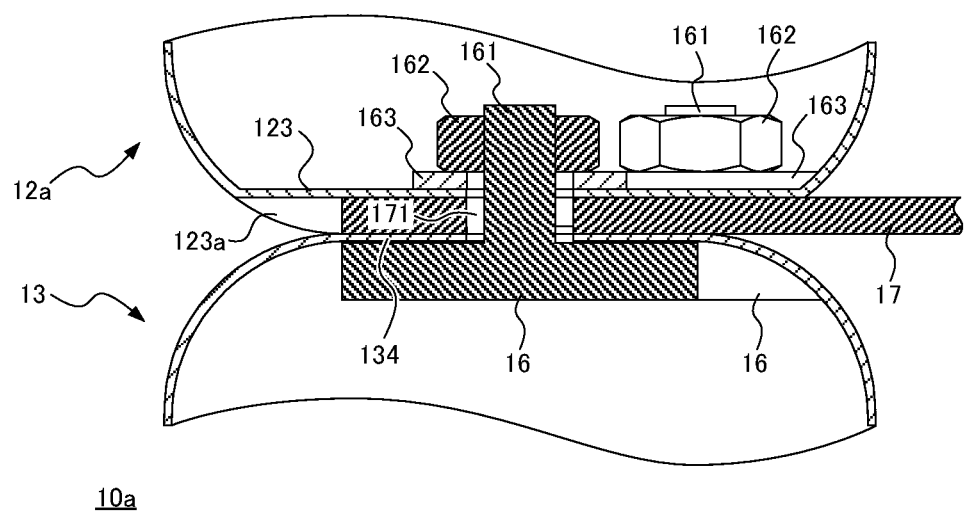
FIG. 11 is a cross-sectional view illustrating a configuration of a beam member.

An adhesion device for a second embodiment will be described. FIG. 10 is a schematic perspective view illustrating a configuration of a partition of the second embodiment. FIG. 11 is a cross-sectional view illustrating a configuration of a beam member.

The adhesion device 10a in this embodiment differs from the adhesion device 10 in the first embodiment in that the adhesion device 10a is further provided with a beam member 17 and a first partition 12a that is partially formed in a different shape to correspond to that of the beam member 17. The beam member 17 is a long plate-like member extending in one direction of the orthogonal directions, preferably either the front-back direction or side-to-side direction, as shown in FIG. 10, across the decompression space, with one end connected to a predetermined protrusion 161 and the other end connected to another predetermined protrusion 161 opposite in the extending direction of the beam member 17. It is desirable that the beam member 17, like the restricting member 16, is made of a material that is at least more rigid than the second partition 13, and that is rigid and lightweight.

FIG. 11 shows a cross section of the restricting member 16 cut by a plane perpendicular to a direction of its extension in a front-back or side-to-side direction, and passing through the point where a protrusion 161 for connecting the beam member 17 is formed. As shown in FIG. 11, insertion portions 123a are formed on the first partition 12a, through which the beam member 17 can be inserted in an orthogonal direction. The insertion portions 123a are formed at positions on the bottom wall portion 123 where both ends of the beam member 17 are connected to two protrusions 161 at each end, and are formed as upwardly concave recesses to match the vertical thickness and transverse width of the beam member 17. As a result, in the case of the first partition 12a, the bottom wall portion 123 is formed higher than the rest in the section where the beam member 17 is disposed.

As the insertion portions 123a are formed as described above, insertion holes are formed between the insertion portions 123a and the top wall portion 134 of the second partition 13 through which the beam member 17 can be inserted, and the connection between the restricting member 16 and the beam member 17 is made when the beam member 17 is inserted into the insertion holes. The connection between the restricting member 16 and the beam member 17 is made in conjunction with the connection between the first partition 12a and the second partition 13; and the connection between the restricting member 16 and the beam member 17 is made by tightening the nuts 162 on the protrusions 161 with the protrusions 161 of the restricting member 16 penetrating the top wall portion 134 of the second partition 13, the connecting holes 171 formed in each of the two ends of the beam member 17, and the bottom wall portion 123 of the first partition 12, from the internal space of the second partition 13, and with the bottom wall portion 123, the beam member 17, and the top wall portion 134 sandwiched between the washer 163 and the restricting member 16. In this connected state, the members related to the connection between the restricting member 16 and the beam member 17 and between the first partition 12 and the second partition 13 are arranged from above in the order of the nut 162, washer 163, bottom wall portion 123, beam member 17, top wall portion 134, and restricting member 16.

Thus, by further disposing the beam member 17, the rigidity of the restricting member 16 can be increased, and accordingly, excessive pulling of the second partition 13 into the decompression space can be prevented. While one beam member 17 is employed in this embodiment, a plurality of beam members 17 may also be used parallel to each other.

A Third Embodiment of the Disclosure

Figure 12:
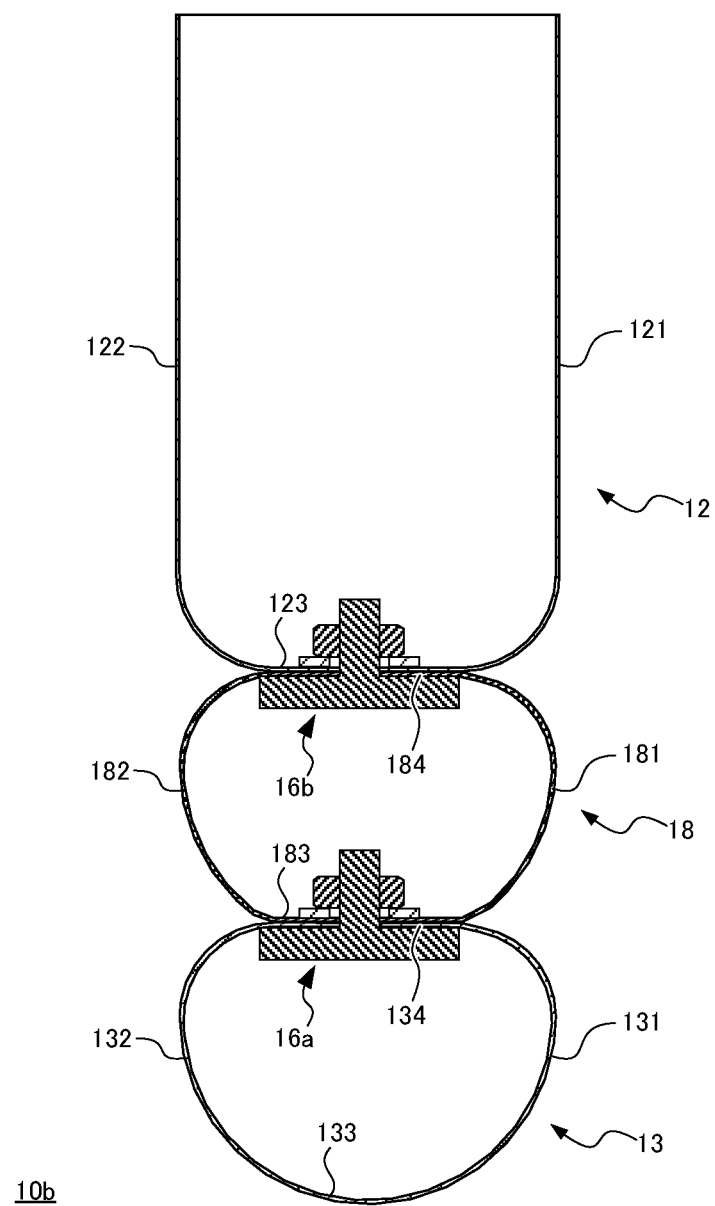
FIG. 12 is a cross-sectional view illustrating a configuration of a partition of the third embodiment.

An adhesion device for a third embodiment will be described. FIG. 12 is a cross-sectional view illustrating a configuration of a partition of the third embodiment.

As shown in FIG. 12, the adhesion device 10b differs from that in the first embodiment in that it is further equipped with a third partition 18 as a component of the partition, and correspondingly, with two restricting members 16a and 16b. The third partition 18 is connected to the first partition 12 and the second partition 13 so as to be sandwiched between the first partition 12 and the second partition 13. The third partition 18, generally like the second partition 13, is formed in a frame shape as a whole so as to surround the decompression space from the orthogonal directions over the entire circumference, that is, from front-back and side-to-side directions, and its cross section is formed in a tubular shape.

Specifically, the third partition 18 comprises an inner wall portion 181 that, on the inner side in the orthogonal direction, extends in a manner to enclose the decompression space from orthogonal directions, an outer wall portion 182 that, on the outer side in the orthogonal direction, extends in a manner to enclose the inner wall portion 181 from orthogonal directions, a bottom wall portion 183 that connects at the bottom of the inner wall portion 181 and the outer wall portion 182 separated in orthogonal directions, and a top wall portion 184 that connects the inner wall portion 181 and the outer wall portion 182 at the top. The third partition 18 is made of a 0.2 mm thick urethane rubber sheet as in the first partition 12 and the second partition 13.

The third partition 18 has the bottom wall portion 183 connected to the top wall portion 134 of the second partition 13 by the restricting member 16a, and the top wall portion 184 connected to the bottom wall portion 123 of the first partition 12 by the restricting member 16b. The method of connection by each of the restricting members 16a and 16b is the same as that by the restricting member 16 in the first embodiment, and will therefore not be elaborated.

Thus, by providing the third partition 18 between the first partition 12 and the second partition 13, the rigidity in the vertical direction can be further reduced and consequently the drag can be reduced when the moving device 1 moves over bumps or dents. In addition, by having the third partition 18 connected to the first partition 12 and second partition 13 each with the restricting members 16a and 16b respectively, the rigidity in the orthogonal direction can be increased and the force of pulling the partition into the decompression space can be dispersed.

While one third partition 18 is employed in this embodiment, two or more third partitions 18 may also be used.

A Fourth Embodiment of the Disclosure

Figure 13:
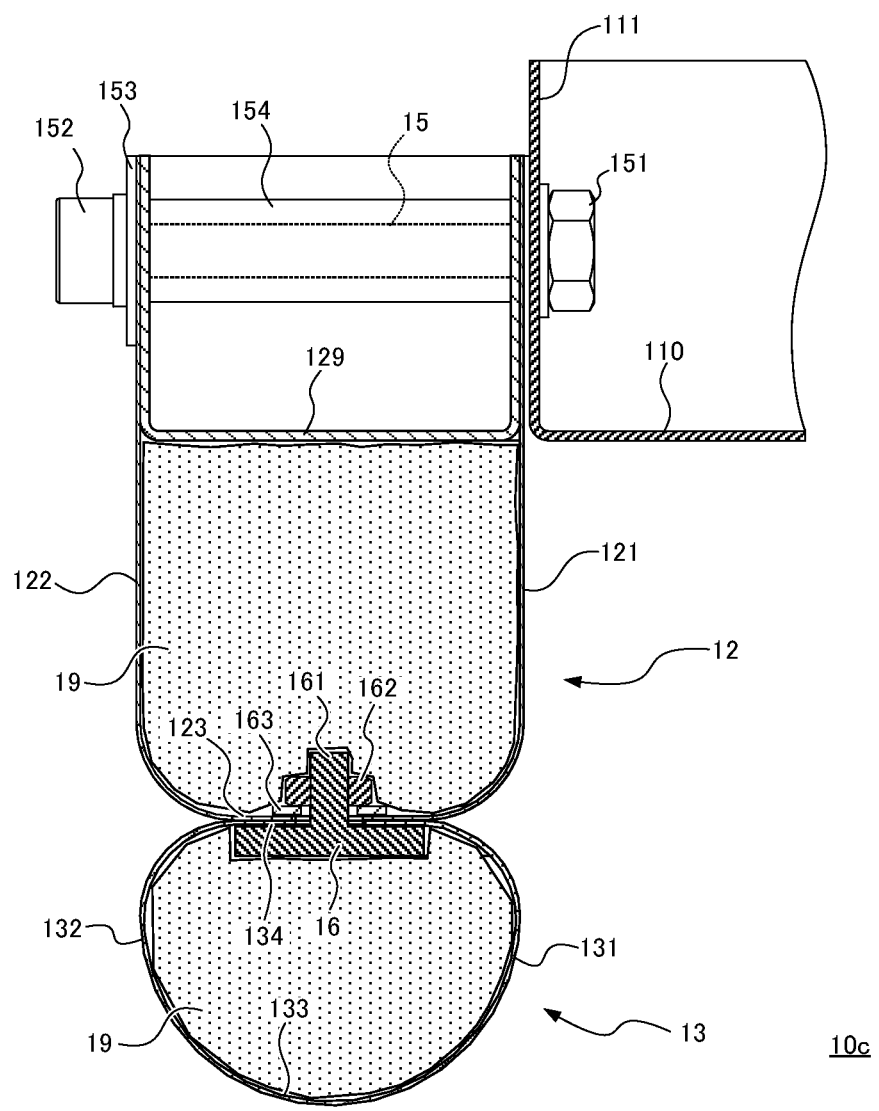
FIG. 13 is a cross-sectional view illustrating a configuration of a partition of the fourth embodiment.

An adhesion device for a fourth embodiment will be described. FIG. 13 is a cross-sectional view illustrating a configuration of a partition of the fourth embodiment.

The adhesion device 10c of this embodiment differs from that of the first embodiment in that the internal spaces formed within the first partition 12 and the second partition 13 are each filled with a filling member 19 as shown in FIG. 13. As described above, the internal space of the second partition 13 is defined by the inner wall portion 131, the outer wall portion 132, the bottom wall portion 133, and the top wall portion 134, and the internal space of the first partition 12 is defined by the inner wall portion 121, the outer wall portion 122, the bottom wall portion 123, and the bottom surface of the connecting member 129.

The filling member 19 is an elastic member that can fill each of the internal spaces described above, and may preferably be a member with elasticity greater than that of the first partition 12 and the second partition 13, and in this embodiment, sponge is filled in the internal spaces as the filling member 19.

By filling the internal spaces with the filling member 19 as described above, it is possible to adjust the vertical rigidity of the partition according to the degree of irregularities of the wall surface on which the moving device 1 is operated. For example, by reducing the amount of filling member 19 for a wall surface with large irregularities and increasing the amount of filling member 19 for a wall surface without large irregularities, the drag of the partition can be adjusted depending on the condition of the wall surface.

A Fifth Embodiment of the Disclosure

Figure 14:
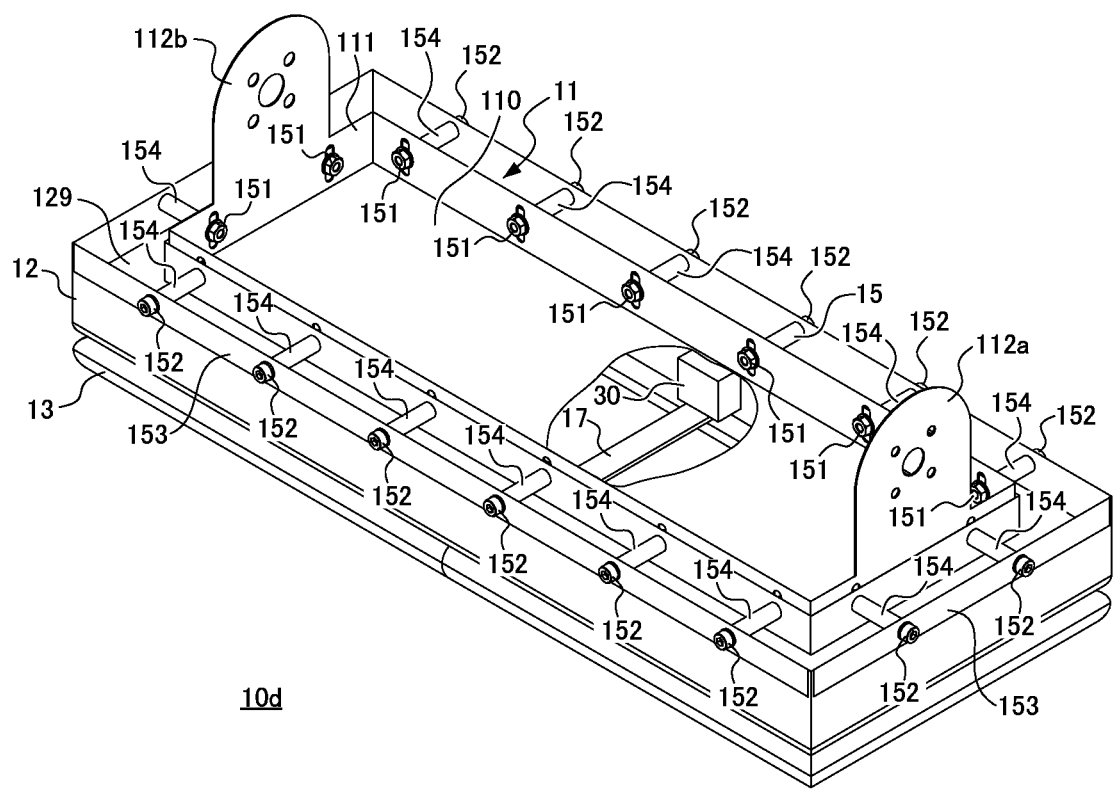
FIG. 14 is a schematic perspective view illustrating a configuration of an adhesion device of the fifth embodiment.

An adhesion device for a fifth embodiment will be described. FIG. 14 is a schematic perspective view illustrating a configuration of the adhesion device of the fifth embodiment. In FIG. 14, a part of the bottom of the base is shown in a cutaway view for explanatory purposes.

The adhesion device 10d of this embodiment differs from the adhesion device 10a of the second embodiment in that it is further equipped with a first adjustment member 30, as shown in FIG. 14. This first adjustment member 30 is provided between the beam member 17 and the bottom portion 110 of the base 11 in the decompression space, and has an elasticity to separate the beam member 17 from the bottom portion 110 vertically, and is formed, for example, by compression springs or spongy rubber.

Thus, by installing the first adjustment member 30 inside the decompression space, the vertical rigidity of the partition can be adjusted more easily than by installing an elastic member inside the first partition 12 or the second partition 13.

A Sixth Embodiment of the Disclosure

Figure 15:
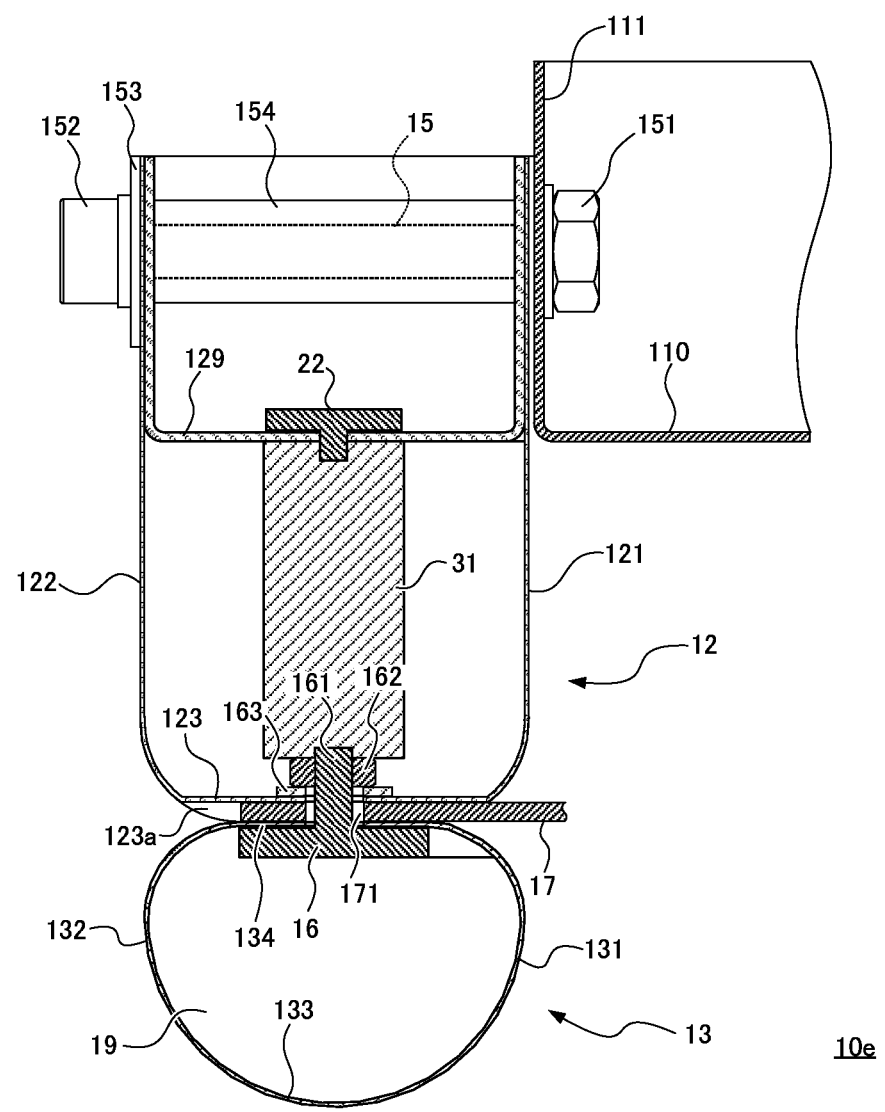
FIG. 15 is a cross-sectional view illustrating a configuration of a partition of the sixth embodiment.

An adhesion device for a sixth embodiment will be described. FIG. 15 is a cross-sectional view illustrating a configuration of a partition of the sixth embodiment.

The adhesion device 10e of this embodiment differs from the adhesion device 10a of the second embodiment in that it is further provided with a second adjustment member 31, as shown in FIG. 15. The second adjustment member 31 is disposed between the connecting member 129 and the bottom wall portion 123 in the internal space defined by the connecting member 129, the inner wall portion 121, the outer wall portion 122, and the bottom wall portion 123 of the first partition 12. The second adjustment member 31 has an elasticity to separate the connecting member 129 from the bottom wall portion 123 vertically, and is made of compression springs or spongy rubber for example. The lower end of the second adjustment member 31 is connected to the protrusion 161 of the restricting member 16, and the upper end of the second adjustment member 31 is connected to the connecting member 129 with an attachment 22.

Thus, by installing the second adjustment member 31 in the internal space of the first partition 12, it is possible to adjust the vertical rigidity of the partition in a more space-saving manner compared to installing the first adjustment member 30 in the decompression space as in the adhesion device 10d of the fifth embodiment, and the environmental tolerance can be improved because the second adjustment member 31 is not exposed to foreign substances outside the internal space.

The embodiment of the present invention has been presented by way of example only, and is not intended to restrict the scope of the invention. The novel embodiment described herein may be embodied in a variety of other forms; furthermore, various omissions, substitutions and changes may be made without departing from the spirit of the invention. The embodiment and modifications are included in the scope or spirit of the present invention and in the appended claims and their equivalents.

REFERENCE SIGNS LIST

10: Adhesion device
11: Base
12: First partition
13: Second partition
14: Decompression device
16: Restricting member (First restricting member)

The invention claimed is:

1. An adhesion device that defines a decompression space to be decompressed between a wall surface and the adhesion device, and adheres to the wall surface, comprising:
   a base disposed facing the wall surface at a distance from the wall surface and connected to a decompression device that depressurizes the decompression space created between the base and the wall surface;
   a first partition disposed on a fringe of the base, wherein the first partition forms a base side portion of a peripheral wall of the decompression space with a second elastic member;
   a second partition disposed closer to a wall surface side than the first partition, wherein a wall surface side portion of the peripheral wall of the decompression space is formed by an elastic member so that a wall surface side end of the second partition contacts the wall surface, and the second partition is formed by a sheet of elastic member to define an internal space that surrounds the decompression space; and
   a first restricting member defining in a frame associated with the second partition by a member having a higher rigidity than that of the second partition, wherein the first restricting member is disposed on the second partition so as to restrict deformation of a base side end of the second partition from being pulled into the decompression space as the decompression space becomes negatively pressured.

2. The adhesion device according to claim 1, further comprising at least one or more third partitions that are disposed between the first partition and the second partition and form the peripheral wall of the decompression space with a third elastic member.

3. The adhesion device according to claim 2, further comprising a second restricting member defining a frame associated with the at least one or more third partitions by a member having a higher rigidity than that of the third partition, and disposed on each of at least one or more third partitions so as to restrict the deformation of a base side end of the third partition from being pulled into the decompression space as the decompression space becomes negatively pressured.

4. The adhesion device according to claim 3, further comprising a beam member that extends across the decompression space and is formed in an elongated shape, and both ends of which are connected to the first restricting member or the second restricting member.

5. The adhesion device according to claim 2, further comprising a beam member that extends across the decompression space and is formed in an elongated shape, and both ends of which are connected to the first restricting member.

6. The adhesion device according to claim 2, wherein: the first partition is formed by a second sheet of elastic member so as to define a second internal space that surrounds the decompression space, and is connected to the base with a connecting member disposed to define the second internal space; the first partition further comprises a second adjustment member that is disposed in the second internal space of the first partition between the connecting member and a bottom of the first partition, and has an elasticity to separate the bottom of the first partition from the connecting member.

7. The adhesion device according to claim 1, further comprising a beam member that extends across the decompression space and is formed in an elongated shape, and both ends of which are connected to the first restricting member.

8. The adhesion device according to claim 7, further comprising a first adjustment member disposed between the base and the beam member in the decompression space and having an elasticity to separate the base and the beam member.

9. The adhesion device according to claim 1, wherein a part of the second partition that contacts the wall surface is formed as a curved surface bulging toward the wall surface.

10. The adhesion device according to claim 9, wherein the internal space of the second partition is filled with a filling member made of an elastic material.

11. The adhesion device according to claim 1, wherein the internal space of the second partition is filled with a filling member made of an elastic material.

12. The adhesion device according to claim 1, wherein: the first partition is formed by a second sheet of elastic member so as to define a second internal space that surrounds the decompression space, and is connected to the base with a connecting member disposed to define the second internal space; the first partition further comprises a second adjustment member that is disposed in the second internal space of the first partition between the connecting member and a bottom of the first partition, and has an elasticity to separate the bottom of the first partition from the connecting member.

13. An adhesion device that defines a decompression space to be decompressed between a wall surface and the adhesion device, and adheres to the wall surface, comprising:

a base disposed facing the wall surface at a distance from the wall surface and connected to a decompression device that depressurizes the decompression space created between the base and the wall surface;

a first partition disposed on a fringe of the base, wherein the first partition forms a base side portion of a peripheral wall of the decompression space with an elastic member;

a second partition disposed closer to a wall surface side than the first partition, wherein a wall surface side portion of the peripheral wall of the decompression space is formed by an elastic member so that a wall surface side end of the second partition contacts the wall surface;

a first restricting member defining a frame associated with the second partition by a member having a higher rigidity than that of the second partition, wherein the first restricting member is disposed on the second partition so as to restrict deformation of a base side end of the second partition from being pulled into the decompression space as the decompression space becomes negatively pressured; and at least one or more third partitions that are disposed between the first partition and the second partition and form the peripheral wall of the decompression space with the elastic member.

14. The adhesion device according to claim 13, further comprising a second restricting member defining a frame associated with at least one or more third partitions by a member having a higher rigidity than that of the third partition, and disposed on each of the at least one or more third partitions so as to restrict the deformation of a base side end of the third partition from being pulled into the decompression space as the decompression space becomes negatively pressured.

15. The adhesion device according to claim 13, further comprising a beam member that extends across the decompression space and is formed in an elongated shape, and both ends of which are connected to the first restricting member.

16. The adhesion device according to claim 15, further comprising a first adjustment member disposed between the base and the beam member in the decompression space and having an elasticity to separate the base and the beam member.

17. The adhesion device according to claim 13, wherein: the first partition is formed by a sheet of elastic member so as to define an internal space that surrounds the decompression space, and is connected to the base with a connecting member disposed to define the internal space; the first partition further comprises a second adjustment member that is disposed in the internal space of the first partition between the connecting member and a bottom of the first partition, and has an elasticity to separate the bottom of the first partition from the connecting member.

18. An adhesion device that defines a decompression space to be decompressed between a wall surface and the adhesion device, and adheres to the wall surface, comprising:

a base disposed facing the wall surface at a distance from the wall surface and connected to a decompression device that depressurizes the decompression space created between the base and the wall surface;

a first partition disposed on a fringe of the base, wherein the first partition forms a base side portion of a peripheral wall of the decompression space with an elastic member;

a second partition disposed closer to a wall surface side than the first partition, wherein a wall surface side portion of the peripheral wall of the decompression space is formed by an elastic member so that a wall surface side end of the second partition contacts the wall surface;

a first restricting member defining a frame associated with the second partition by a member having a higher rigidity than that of the second partition, wherein the first restricting member is disposed on the second partition so as to restrict deformation of a base side end of the second partition from being pulled into the decompression space as the decompression space becomes negatively pressured; and a beam member that extends across the decompression space and is formed in an elongated shape, and both ends of which are connected to the first restricting member.

19. The adhesion device according to claim 18, further comprising a first adjustment member disposed between the base and the beam member in the decompression space and having an elasticity to separate the base and the beam member.

20. The adhesion device according to claim 18, wherein: the first partition is formed by a sheet of elastic member so as to define an internal space that surrounds the decompression space, and is connected to the base with a connecting member disposed to define the internal space; the first partition further comprises a second adjustment member that is disposed in the internal space of the first partition between the connecting member and a bottom of the first partition, and has an elasticity to separate the bottom of the first partition from the connecting member.

* * * * *